(12) United States Patent
Hirano et al.

(10) Patent No.: US 7,903,181 B2
(45) Date of Patent: Mar. 8, 2011

(54) RECORDING DEVICE, RECORDING SYSTEM, AND RECORDING METHOD

(75) Inventors: Atsushi Hirano, Ebina (JP); Taijyu Gan, Ebina (JP); Haruo Harada, Ebina (JP); Takashi Morikawa, Ebina (JP); Chisato Urano, Ebina (JP); Yasunori Okano, Tokyo (JP); Hiroshi Arisawa, Ebina (JP); Takeo Kakinuma, Tokyo (JP); Chikara Manabe, Ebina (JP)

(73) Assignee: Fuji Xerox Co., Ltd., Tokyo (JP)

(*) Notice: Subject to any disclaimer, the term of this patent is extended or adjusted under 35 U.S.C. 154(b) by 0 days.

(21) Appl. No.: 12/724,164

(22) Filed: Mar. 15, 2010

(65) Prior Publication Data

US 2010/0296011 A1    Nov. 25, 2010

(30) Foreign Application Priority Data

May 25, 2009  (JP) ................................ 2009-125397
Sep. 4, 2009   (JP) ................................ 2009-204561

(51) Int. Cl.
*G02F 1/13*        (2006.01)

(52) U.S. Cl. ................. 349/2; 349/1; 349/19; 349/24; 349/25

(58) Field of Classification Search ............... 349/1, 2, 349/19, 24, 25
See application file for complete search history.

(56) References Cited

U.S. PATENT DOCUMENTS

| 5,516,607 A * | 5/1996 | Iijima et al. ................ 430/20 |
| 6,908,036 B2 * | 6/2005 | Koshimizu et al. ........ 235/492 |
| 2004/0119933 A1 | 6/2004 | Harada et al. |

FOREIGN PATENT DOCUMENTS

| JP | A 2000-163025 | 6/2000 |
| JP | A 2002-040386 | 2/2002 |
| JP | A 2004-126139 | 4/2004 |
| JP | A 2004-198949 | 7/2004 |
| JP | A 2005-196062 | 7/2005 |
| JP | A 2008-185656 | 8/2008 |

* cited by examiner

*Primary Examiner* — Jennifer Doan
(74) *Attorney, Agent, or Firm* — Oliff & Berridge, PLC

(57) ABSTRACT

A recording device includes a first voltage application unit that applies a first voltage to a display layer; a second voltage application unit that applies a second voltage; a first irradiation unit that irradiates to the display layer first light synchronized with the application of the second voltage; a second irradiation unit that irradiates to the display layer a second light after the application of the second voltage is terminated, the second light having a third intensity if the second light is irradiated at an area corresponding to the first tone in the second liquid crystal layer, the second light not being irradiated if the second light is irradiated at an area corresponding to the second tone in the second liquid crystal layer.

12 Claims, 12 Drawing Sheets

P: PLANER ORIENTATION
F: FOCALCONIC ORIENTATION
H: HOMEOTROPIC ORIENTATION

RECORDING DEVICE, RECORDING SYSTEM, AND RECORDING METHOD

CROSS-REFERENCE TO RELATED APPLICATIONS

This application claims priorities under 35 USC 119 from two Japanese patent applications: No. 2009-125397 filed on May 25, 2009; and No. 2009-204561 filed on Sep. 4, 2009.

BACKGROUND

1. Technical Field

The present invention relates to a recording device, a recording system, and a recording method.

2. Related Art

There is known an electronic paper (hereinafter "e-paper") on which an image can be recorded upon irradiation of the e-paper with light.

SUMMARY

According to one aspect of the present invention, there is provided a recording device including, a first voltage application unit that applies a first voltage to a display layer, the display layer including a photoconductive layer, a first liquid crystal layer and a second liquid crystal layer, an impedance of the photoconductive layer being changeable upon irradiation with light, and an orientation of the first liquid crystal layer and the second liquid crystal layer being transformable to a first orientation upon application of the voltage from the first voltage application unit; a second voltage application unit that applies a second voltage after application of the first voltage is terminated, an orientation of the second liquid crystal layer being transformable to a second orientation upon application of the second voltage; a first irradiation unit that irradiates the display layer with a first light in synchronicity with the application of the second voltage, the first light having a first intensity if the first light is irradiated at an area corresponding to a first tone in the first liquid crystal layer, and the first light having a second intensity that is less than first intensity if the first light is irradiated at an area corresponding to a second tone in the first liquid crystal layer; a second irradiation unit that irradiates the display layer with a second light after application of the second voltage is terminated, the second light having a third intensity if the second light is irradiated at an area corresponding to the first tone in the second liquid crystal layer, the second light not being irradiated if the second light is irradiated at an area corresponding to the second tone in the second liquid crystal layer.

BRIEF DESCRIPTION OF THE DRAWINGS

Exemplary embodiments of the present invention will be described in detail based on the following figures, wherein.

DETAILED DESCRIPTION

1. First Exemplary Embodiment 1-1. Configuration 1-1-1. The Recording Device 100

Figure 1:
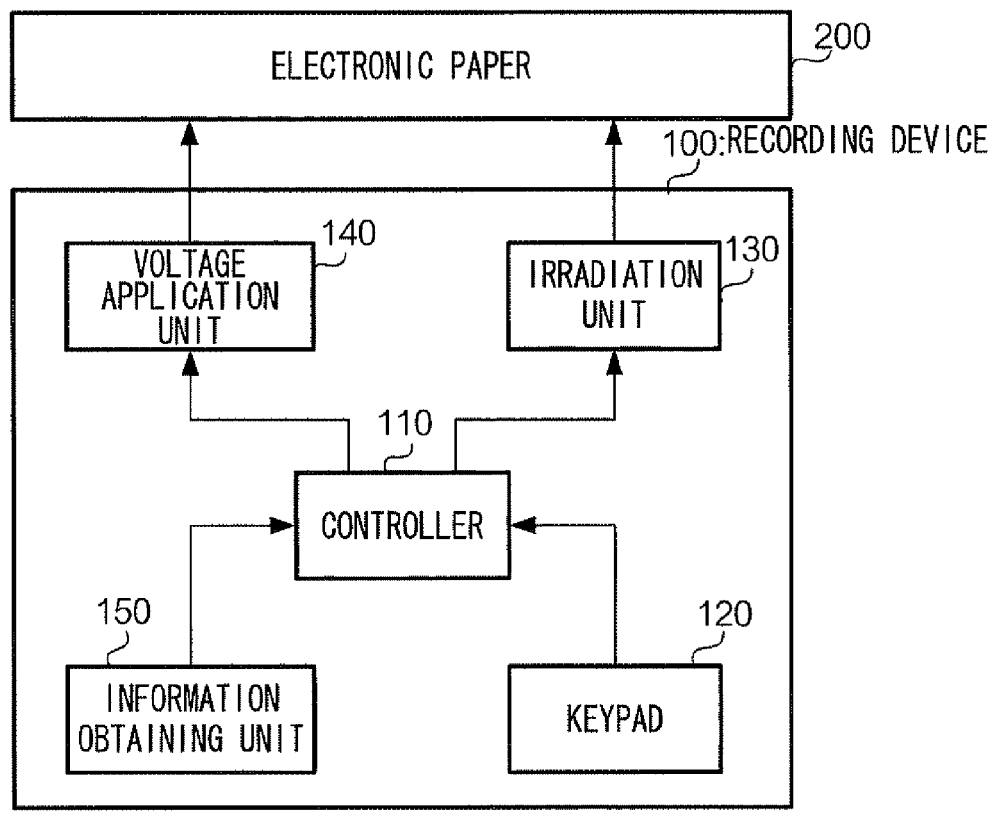
FIG. 1 shows a block diagram illustrating a configuration of a recording device 100.

FIG. 1 shows a block diagram illustrating a configuration of a recording device 100 in accordance with one exemplary embodiment of the invention. The recording device 100 is a device that records on the e-paper 200 an image in response to image information. A term "recording system" refers to a system including the recording device 100 and the e-paper 200. The recording device 100 includes a controller 110, a keypad 120, an irradiation unit 130, a voltage application unit 140, and an information-obtaining unit 150.

The controller 110 includes a processor such as a CPU (Central Processing Unit) and a storage unit such as a memory. The controller 110 controls an element of the recording device 100. The keypad 120 is an input device for inputting an instruction by a user; for example, selecting an item, confirmation, or a cancellation. The keypad 120 includes a keyboard or a touch panel, and outputs to the controller 110 information showing an operation instruction input by the user.

The irradiation unit 130 includes a light source for irradiating light to the e-paper 200. Hereinafter, light used for recording an image with the e-paper 200 is referred to as "recording light." The light source includes, for example, a semiconductor laser device. The light irradiated by the light source is reflected by a reflector such as a mirror and is focused by a lens. The light focused as a spot, is irradiated at a pixel. The pixel is a unit area for showing an image on the e-paper 200. The irradiation unit 130 scans the spot on the e-paper 200 under the control of the controller 110. The light source may be an LED (Light Emitting Diode) array including plural LEDs arranged on a line. Alternatively, a backlight and an LCD (Liquid Crystal Display) panel that selectively transmits light from the backlight may be used as the light source.

The voltage application unit 140 applies a voltage to the e-paper 200 via electrodes (not shown in the figures) under the control of the controller 110. Hereinafter, voltage used for recording (writing) an image with the e-paper 200 is referred to as "recording voltage." The recording device 100 has a mechanism to hold the e-paper 200. While holding the e-paper 200, the recording device 100 applies voltage and irradiates light with the e-paper 200. The controller 110 controls the voltage application unit 140 so as to apply voltage synchronized with the irradiation of the recording light by the irradiation unit 130.

The information-obtaining unit 150 obtains various information such as a control program or image information showing an image, from a storage unit or an external device (neither not shown in the figures). In this example, the information-obtaining unit 150 obtains information via a communication unit with wireless or wired communication. The information-obtaining unit 150 may obtain information via an interface with a semiconductor memory such as a USB memory or a memory card, or an optical disc such as a CD or DVD, instead of the communication unit.

1-1-2. The e-paper 200

Figure 2:
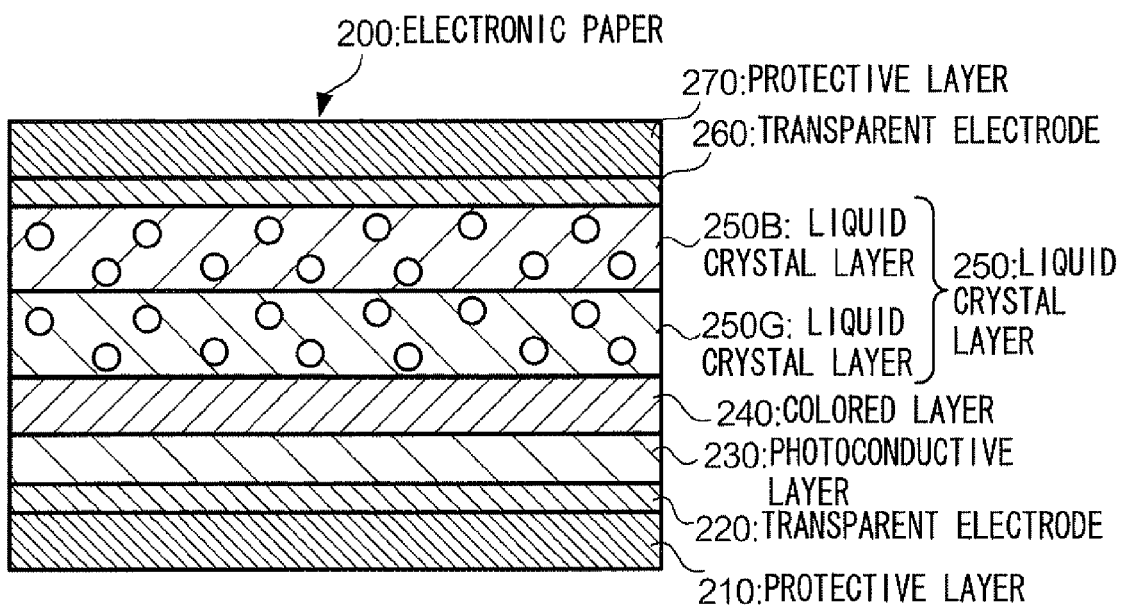
FIG. 2 shows a configuration of the e-paper 200.

FIG. 2 shows a configuration of the e-paper 200 in accordance with one exemplary embodiment of the invention. The e-paper 200 is an example of a recording medium recorded with light irradiation. The e-paper 200 includes a protective layer 210, a protective layer 270, a transparent electrode 220, a transparent electrode 260, a photoconductive layer 230, a colored layer 240, a liquid crystal layer 250B and a liquid crystal layer 250G, whereby a screen is constructed.

The protective layers 210 and 270 are layers for protecting surfaces of the e-paper 200. The protective layers 210 and 270 include PET (polyethylene terephthalate). The protective layer 210 is formed at a side (back side) through which the recording device 100 irradiates light. The protective layer 270 is formed at the other side (foreside) through which a user can see an image recorded on the e-paper 200. The transparent electrodes 220 and 260 include ITO (Indium Tin Oxide). The recording device 100 applies voltage between the transparent electrodes 220 and 260.

The photoconductive layer 230 is a layer whose impedance changes in response to irradiated light. The photoconductive layer 230 includes, for example, OPC (Organic Photoconductor). If light having a specific wavelength is irradiated, the photoconductive layer 230 generates charges and the impedance of the photoconductive layer 230 becomes lower than that when dark. In other words, if light is irradiated, voltage applied to the liquid crystal layer 250 increases since the impedance of the photoconductive layer 230 becomes lower than that when dark. Hereinafter, a layer including the photoconductive layer 230 and the liquid crystal layer 250 may be referred to as "display layer."

The colored layer 240 is a layer that can be seen by a user when the liquid crystal layer 250 transmits light. In this example, the colored layer 240 is red. It is to be noted that the colored layer 240 may be omitted. In such a case, irradiated light may be absorbed by the photoconductive layer 230.

The liquid crystal layer 250 includes liquid crystal molecules, for example, cholesteric liquid crystal molecules, whose orientation changes in response to energy supplied by, for example, a voltage. In the liquid crystal layer 250, the cholesteric liquid crystal molecules are capsulated in micro-capsules. The micro-capsules are dispersed in binder resin. Orientations of the cholesteric liquid crystal include planer orientation (an example of a third orientation), focal conic orientation (an example of a first orientation), and homeotropic orientation (an example of a second orientation). The planer orientation and the focal conic orientation are thermally stable and are maintained without voltage application. In other words, the cholesteric liquid crystal is bi-stable material having thermally stable states: the planer orientation and the focal conic orientation. In the planer orientation, the cholesteric liquid crystal molecules reflect light having a specific wavelength. In the focal conic orientation, the cholesteric liquid crystal molecules transmit the light. The e-paper 200 shows an image by using differences in reflectivity.

Figure 3:
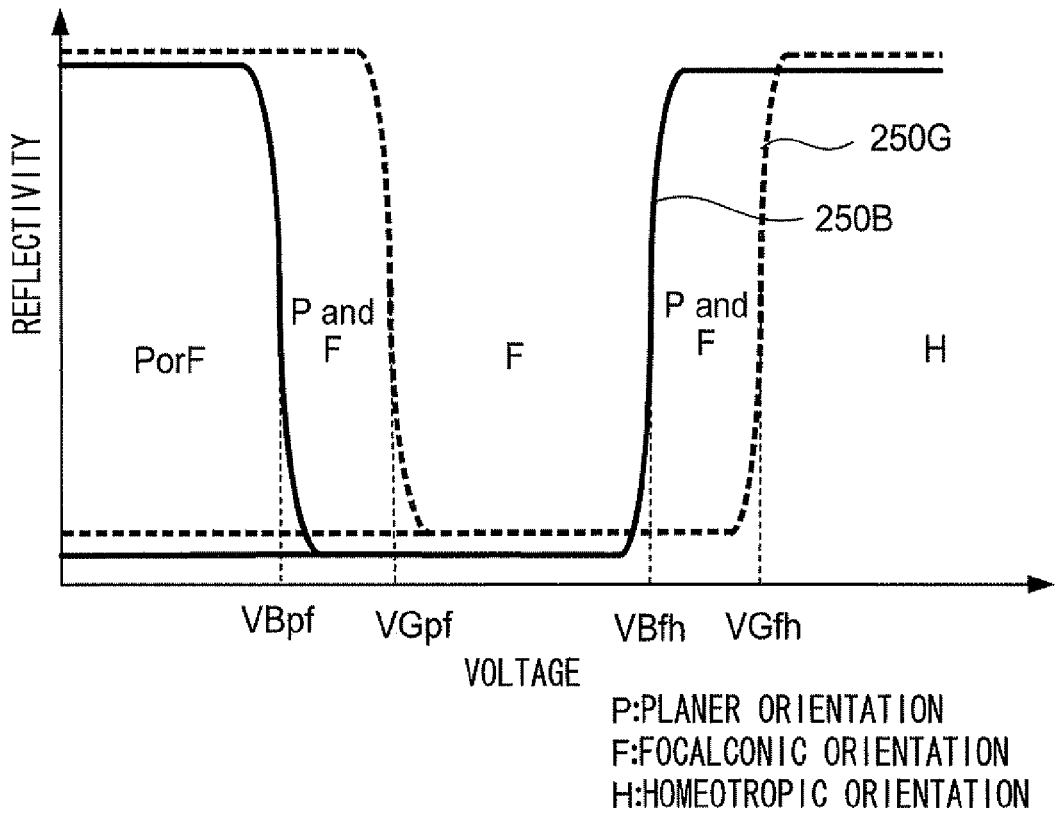
FIG. 3 shows an example of reflectivity-voltage curve of the liquid crystal layer 250.

FIG. 3 shows an example of reflectivity-voltage curve of the liquid crystal layer 250. In FIG. 3, the vertical axis shows the reflectivity of the liquid crystal layer 250 and the horizontal axis shows voltage applied to the liquid crystal layer 250. A voltage VBpf denotes a threshold voltage of transition from the planer orientation to the focal conic orientation in the liquid crystal layer 250B. A voltage VBfh denotes a threshold voltage of transition from the focal conic orientation to the homeotropic orientation in the liquid crystal layer 250B. A voltage VGpf denotes a threshold voltage of transition from the planer orientation to the focal conic orientation in the liquid crystal layer 250G. A voltage VGfh denotes a threshold voltage of transition from the focal conic orientation to the homeotropic orientation in the liquid crystal layer 250G. Here, if it is not necessary to distinguish the liquid crystal layer 250B from the liquid crystal layer 250G, the threshold voltage may be denoted as Vpf, for example.

The orientation of the cholesteric liquid crystal changes in response to the applied voltage. In an example of FIG. 3, the orientation does not change with a voltage range of $0<V<Vpf$ (Here, voltage V denotes voltage applied to liquid crystal layer 250). The orientation transforms into the focal conic orientation with a voltage range of $Vpf<V<Vfh$. If liquid crystal layer 250 is in the focal conic orientation before the voltage application, the focal conic orientation is maintained. The orientation transforms into the homeotropic orientation with a voltage range of $V>Vfh$.

The homeotropic orientation is thermally unstable. When the voltage application is terminated, liquid crystal layer 250 transforms into the planer orientation or the focal conic orientation. The orientation of liquid crystal layer 250 depends on amount of time by which the voltage applied to the liquid crystal becomes approximately zero after the application of voltage V ($V>Vfh$) is terminated.

In this example, in liquid crystal layer 250, liquid crystal layer 250B (an example of a second liquid crystal layer) and liquid crystal layer 250G (an example of a first liquid crystal layer) are laminated. Liquid crystal layer 250B includes liquid crystal molecules that reflect blue light in the planer orientation. The liquid crystal layer 250G includes liquid crystal molecules that reflects green light in the planer orientation.

1-2. Operation

Figure 4:
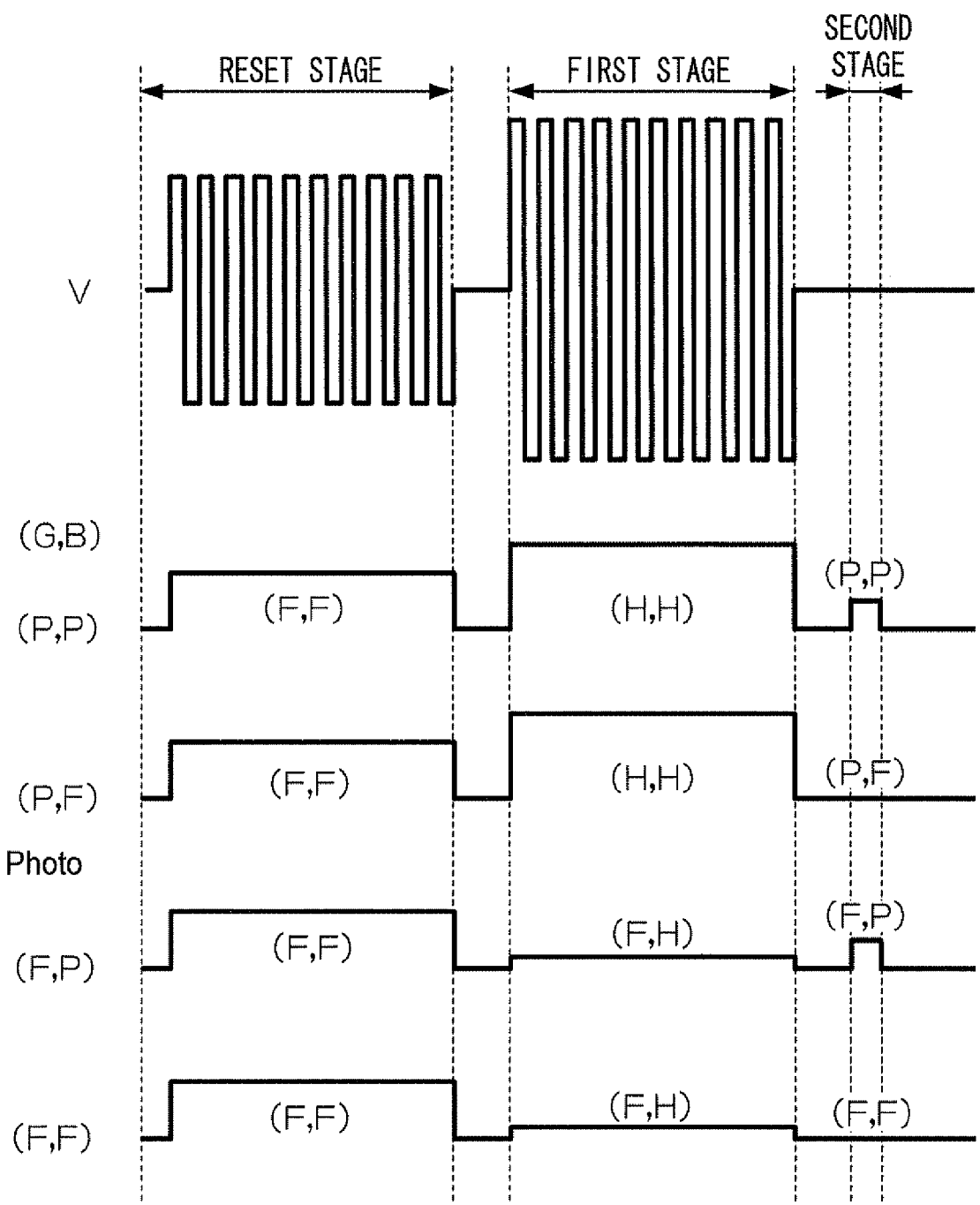
FIG. 4 shows a timing chart illustrating a process for recording an image on the e-paper 200.

FIG. 4 shows a timing chart illustrating a process for recording an image on the e-paper 200 (or for driving the e-paper 200). A signal V denotes voltage applied to the display layer. A signal Photo denotes light irradiated to the display layer. In this example, different patterns of light signals are used for different tones of pixels. The tone of a pixel, in other words, the orientation of the liquid crystal molecules, is shown as (G, B). The elements G and B denote the orientation of liquid crystal layers 250G and 250B, respectively. P, F, and H denote the planer orientation (an example of a third orientation), the focal conic orientation (an example of a first orientation), and the homeotropic orientation (an example of a second orientation).

In this example, a process for recording an image on the e-paper 200 includes three stages, reset stage, a first stage, and a second stage. In the following example, an image shown on the e-paper 200 includes a green element and a blue element. The tone of each element is represented by two levels, 0 and 1, in other words, high-brightness state and low-brightness state. The high-brightness state corresponds to the planer orientation and is an example of a first tone. The low-brightness state corresponds to the focal conic orientation and is an example of a second tone. In the following description, the tone values 0 and 1 are denoted as F and P, respectively, for the purpose of simplification.

The reset stage is a stage for transforming liquid crystal layers 250G and 250B into the focal conic orientation. In the reset stage, the voltage application unit 140 and the irradiation unit 130 apply voltage V (VGpf<V<VBfh) that causes liquid crystal layers 250G and 250B to transform into the focal conic orientation. More specifically, the voltage application unit 140 applies voltage to the display layer and the irradiation unit 130 irradiates light to the display layer, so that such voltage is applied to display layer 250. It is to be noted that the light may not be irradiated, if liquid crystal layers 250G and 250B transform into the focal conic orientation without light irradiation.

The first stage is a stage for determining the orientation of liquid crystal layer 250G, which is an example of a liquid crystal layer whose threshold voltage in the reflectivity-voltage curve is higher than that of the other liquid crystal layer. In the first stage, the irradiation unit 130 irradiates light having one of two levels, in response to a tone of green element. If the tone of the green element is P, the irradiation unit 130 irradiates light having a power P1 (an example of a first intensity). If the tone of the green element is F, the irradiation unit 130 irradiates light having a power P2 (an example of a second intensity). Here, the intensities P1 and P2 satisfies P1>P2. In the first stage, states with irradiation of light having intensities P1 and P2 are denoted as "photo" and "almost dark," respectively.

In the first stage, if the light having the intensity P1 is irradiated, voltage V1 (V1>VGfh in the example of FIG. 3), causing (G, B)=(H, H), is applied to liquid crystal layer 250. If the light having the intensity P2 is irradiated, voltage V2 (VBfh<V2<VGfh in the example of FIG. 3), causing (G, B)=(H, H), is applied to liquid crystal layer 250. The voltage application unit 140 applies voltage and the irradiation unit 130 irradiates light so that such a voltage is applied to liquid crystal layer 250.

The second stage is a stage for determining the orientation of liquid crystal layer 250B, which is an example of a liquid crystal layer whose threshold voltage in the reflectivity-voltage curve is lower than that of the other liquid crystal layer. In the second stage, the voltage application unit 140 applies no voltage. The irradiation unit 130 irradiates light having one of two levels, in response to a tone of blue element. If the tone of the blue element is P, the irradiation unit 130 irradiates light having an intensity P3 (an example of a third intensity). If the tone of the blue element is F, the irradiation unit 130 irradiates no light. In the second stage, a state with irradiation of light having intensity P3 is denoted as "photo" and state without light irradiation is denoted as "dark." The light irradiation of the second stage is initiated immediately after the voltage application in the first stage is terminated. Here, "immediately after the voltage application in the first stage is terminated" means that the amount of time from termination of the voltage application is short enough to release residual voltage so as not to transform into the focal conic orientation.

Description will now be provided for selecting orientation in the second stage. In the second stage, the voltage application unit 140 applies no voltage. However, residual voltage Vt, which is generated in the first stage, is applied to the liquid crystal layer.

Figure 5:
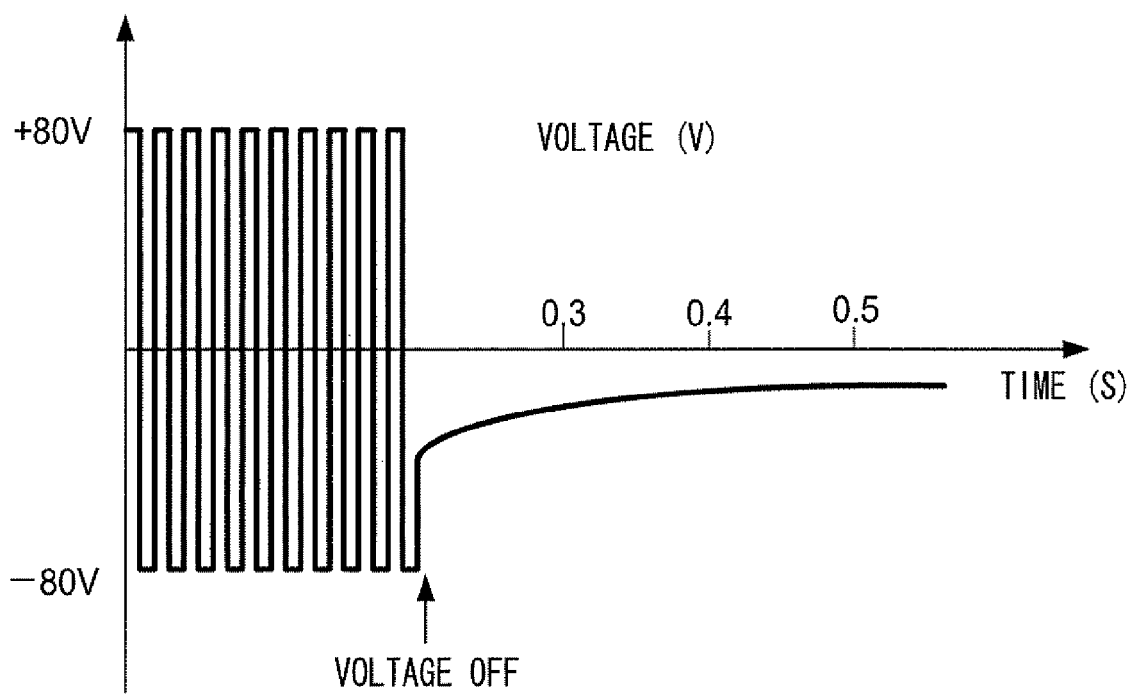
FIG. 5 shows an example of the residual voltage applied to the liquid crystal layer 250 in the second stage (without light irradiation)

FIG. 5 shows an example of the residual voltage applied to liquid crystal layer 250 in the second stage (without light irradiation). The vertical axis shows the voltage applied to liquid crystal layer 250B and the horizontal axis shows time. In this example, in the first stage, voltage having amplitude ±80 V with frequency of 50 Hz is applied. By the voltage application of the first stage, the liquid crystal layer 250B transforms into the homeotropic orientation. In this example, at the time that the voltage application in the first stage is terminated, approximately 40 V of residual voltage is generated. The residual voltage gradually decreases, by half in approximately 100 to 150 msec. If the residual voltage Vt is greater than threshold voltage (Vt>VBhf) and the time during which the residual voltage is greater than threshold voltage is enough to transform liquid crystal layer 250B into the focal conic orientation, liquid crystal layer 250B transforms into the focal conic orientation.

Figure 6:
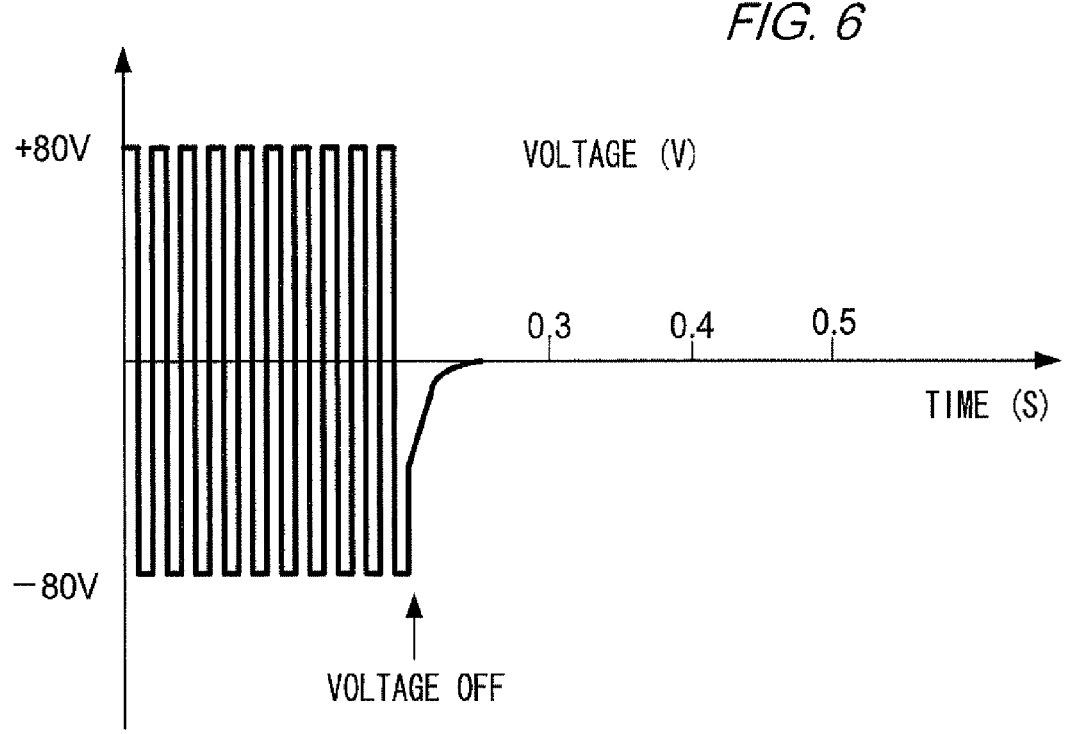
FIG. 6 shows an example of the residual voltage applied to the liquid crystal layer 250 in the second stage (with light irradiation)

FIG. 6 shows an example of the residual voltage applied to liquid crystal layer 250 in the second stage (with light irradiation). In this example, similarly to FIG. 5, in the first stage, voltage having amplitude ±80 V with frequency of 50 Hz is applied. In this example, at the time that the voltage application in the first stage is terminated, approximately 40 V of residual voltage is generated. However, by the light irradiation, the residual voltage rapidly decreases and is approximately zero after approximately 10 msec. By the rapid decrease of the residual voltage, the liquid crystal layer 250B transforms into the planer orientation.

Figure 7:
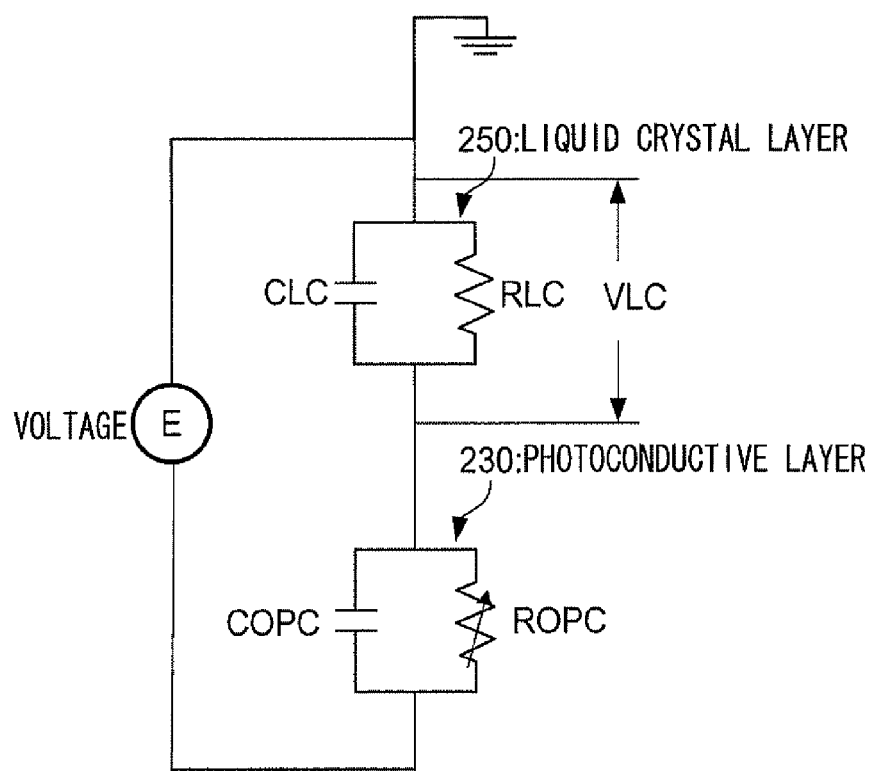
FIG. 7 shows an example of an equivalent circuit of the e-paper 200.

FIG. 7 shows an example of an equivalent circuit of the e-paper 200. For the purpose of simplification, FIG. 7 shows an example in which liquid crystal layer 250 includes a single liquid crystal layer. In the equivalent circuit, liquid crystal layer 250 is represented as a resistance RLC and a capacitance CLC, which are parallel connected. The photoconductive layer 230 is represented as a resistance ROPC and a capacitance COPC, which are parallel connected. The photoconductive layer 230 and liquid crystal layer 250 are series-connected. Voltage ±E with frequency f is applied to the photoconductive layer 230 and liquid crystal layer 250. Voltage applied to liquid crystal layer 250 is denoted as voltage VLC. The Resistance ROPC of the photoconductive layer 230 decreases with light irradiation.

The attenuation of the residual voltage Vt depends on the resistance ROPC, as shown in the following equation (1).

$$V_t = V_{LC} e^{-t/\tau} \quad (1)$$

Here, a time constant τ decreases with decreasing the resistance ROPC. In other words, if the resistance ROPC decreases by the light irradiation, the residual voltage Vt rapidly decreases.

Here, the voltage VLC converges to the following equation (2) with sufficiently long driving time. By using the equation (2), the liquid crystal layer 250 and the photoconductive layer 230 can be designed.

If light is irradiated at the first stage, the resistance ROPC decreases and voltage applied to liquid crystal layer 250 increases. Then, charges are generated. Under such a condition, if light is irradiated after the first stage is terminated, the resistance ROPC and τ increase. In other words, the residual voltage is greater than that in a case without light irradiation at the first stage.

Here, the orientation of the liquid crystal layer 250B can be controlled by the following design, that is: (a) if the light is not irradiated at the second stage, an amount of time during which the residual voltage Vt is greater than threshold voltage VBhf is greater than a threshold time; if the light is irradiated at the second stage, an amount of time during which the residual voltage Vt is greater than threshold voltage VBhf is less than threshold time. Furthermore, if the residual voltage Vt is designed so as to satisfy Vt<VGhf, the orientation of the liquid crystal layer 250B can be controlled with the orientation of the liquid crystal layer 250G being maintained.

Figure 8:
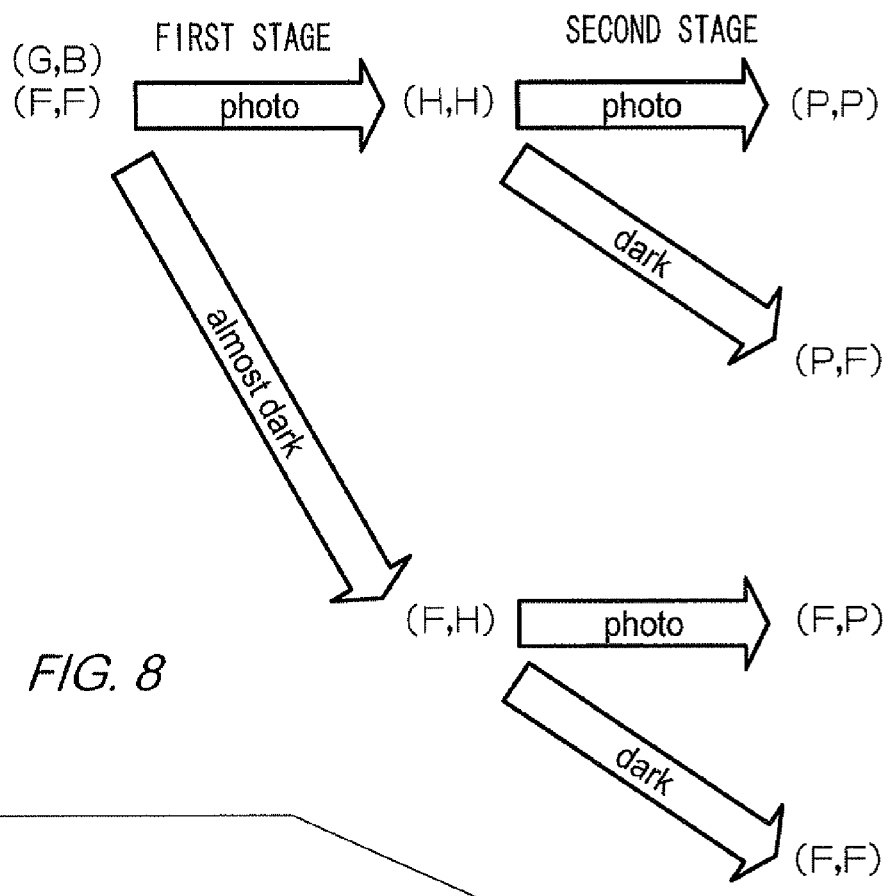
FIG. 8 illustrates control of the orientation.

FIG. 8 illustrates control of the orientation in accordance with the present exemplary embodiment. If the first stage is "photo", the orientation of liquid crystal layer 250G finally becomes the planer orientation. If the first stage is "almost dark," the orientation of the liquid crystal layer 250G finally becomes the focal conic orientation. If the second stage is "photo," the orientation of the liquid crystal layer 250B finally becomes the planer orientation. If the second stage is "dark", the orientation of liquid crystal layer 250B finally becomes the focal conic orientation. Thus, the orientation of liquid crystal layer 250G depends on the light irradiation at the first stage and the orientation of liquid crystal layer 250B depends on the light irradiation at the second stage.

Figure 9:
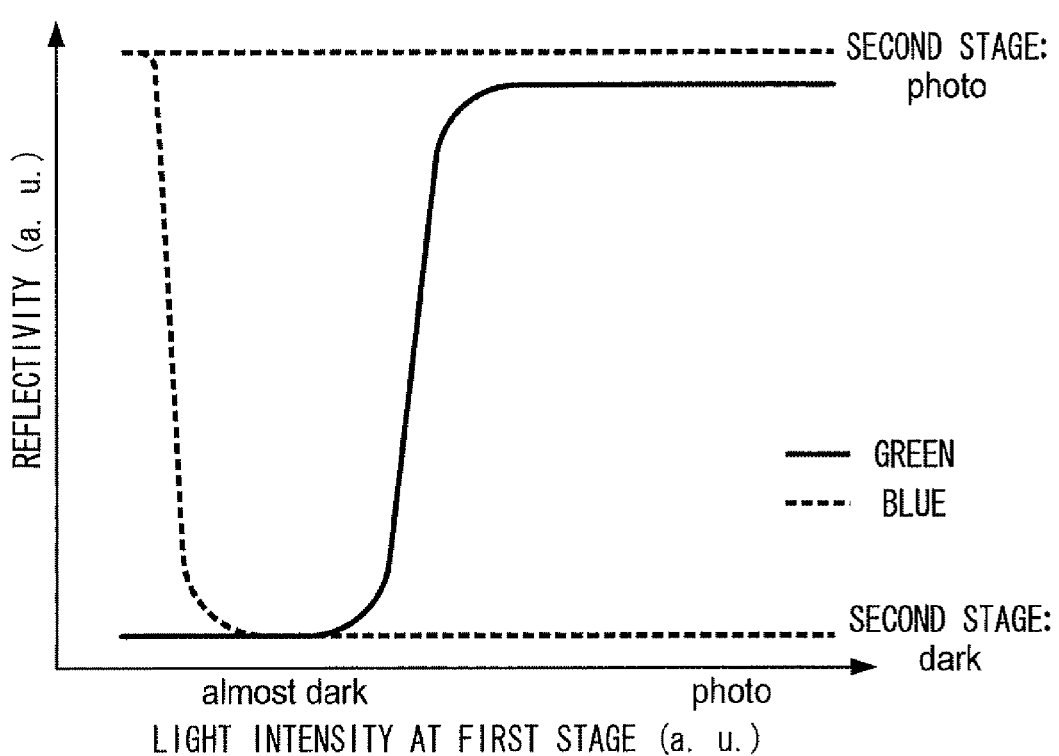
FIG. 9 illustrates control of the orientation.

FIG. 9 illustrates control of the orientation in accordance with the present exemplary embodiment. In FIG. 9, the vertical axis shows reflectivity (or tone) and the horizontal axis shows light intensity at the first stage. The solid line corresponds to liquid crystal layer 250G, and the dashed lines correspond to liquid crystal layer 250B. One dashed line corresponds to a case where there is light irradiation at the second stage and the other dashed line corresponds to a case where there is no light irradiation at the second stage. The solid line does not depend on light irradiation at the second stage. The orientation of liquid crystal layer 250G depends on the light intensity at the first stage, and the orientation of liquid crystal layer 250B depends on the light intensity at the second stage.

Figure 10A:
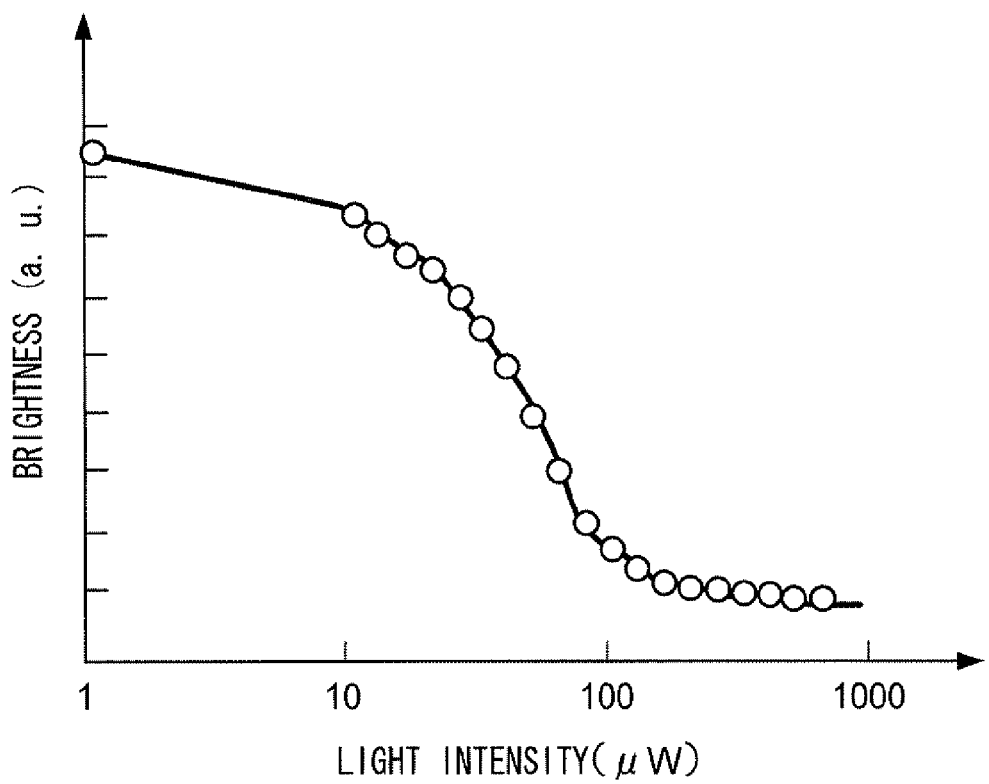
FIG. 10 shows an example of a dead band for unintentional light.
Figure 10B:
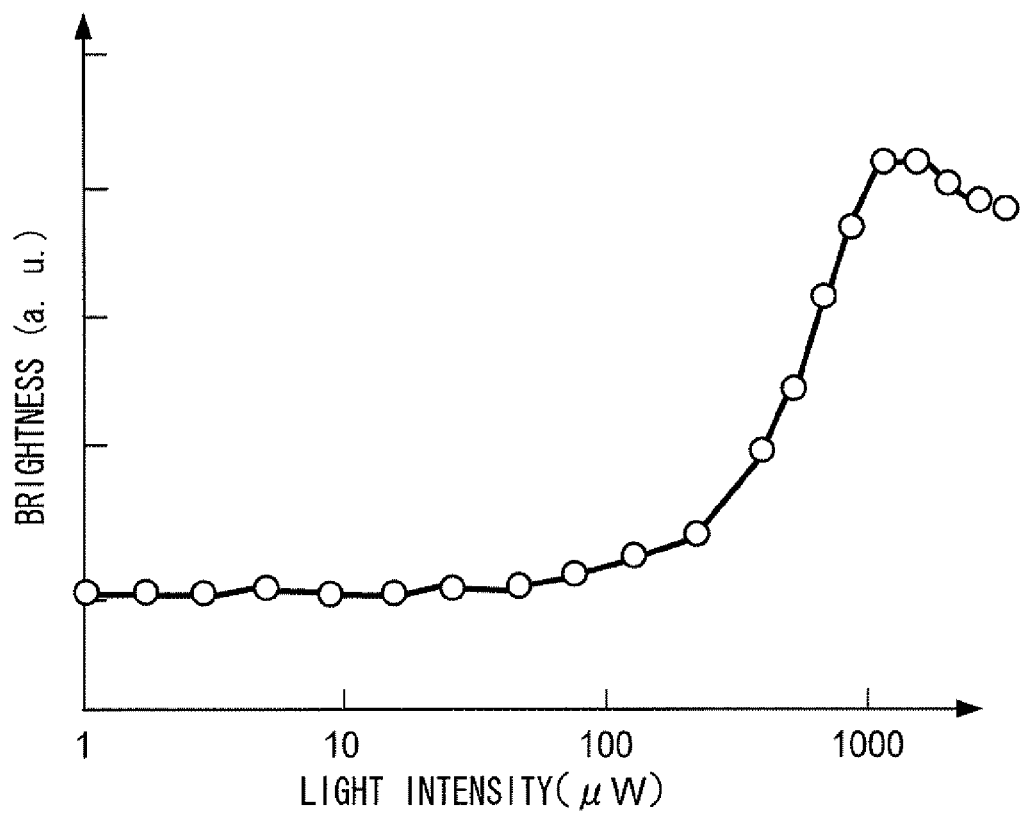

FIG. 10 shows an example of a dead band for unintentional light. In FIG. 10, the vertical axis shows brightness (or reflectivity) of the liquid crystal layer 250B and the horizontal axis shows intensity of light irradiated to the liquid crystal layer 250B. The light intensity is the sum of recording light and unintentional light. Here, "unintentional light" refers not to light (primary light for the first stage and secondary light for the second stage) intentionally irradiated to a target pixel, but to light used to write data in an adjacent pixel or light from an unrelated source. FIG. 10A shows an example of recording an image by voltage application and light irradiation related to JP-A-2004-198949. FIG. 10B shows an example of recording an image with the tone control by the secondary light.

In the example of FIG. 10A, for example, light irradiation with 10 μW of light causes approximately 10% decrease in brightness. Furthermore, light irradiation with 100 μW of light causes approximately 90% decrease in brightness. On the contrary, according to the present exemplary embodiment, light irradiation with 10 μW of light causes no substantial decrease in brightness. Furthermore, light irradiation with 100 μW of light causes approximately 10% decrease of the brightness. Thus, brightness decrease in the low-intensity area is reduced. As shown in FIG. 10B, according to the tone control by the secondary light irradiation, the dead band (an area in which decrease of the brightness is almost zero) is wider than that of the two-times voltage application and the irradiation. As described above, according to the present exemplary embodiment, the dead band is wider.

1-3. Appendix: Determination of the Threshold Voltage

Figure 11:
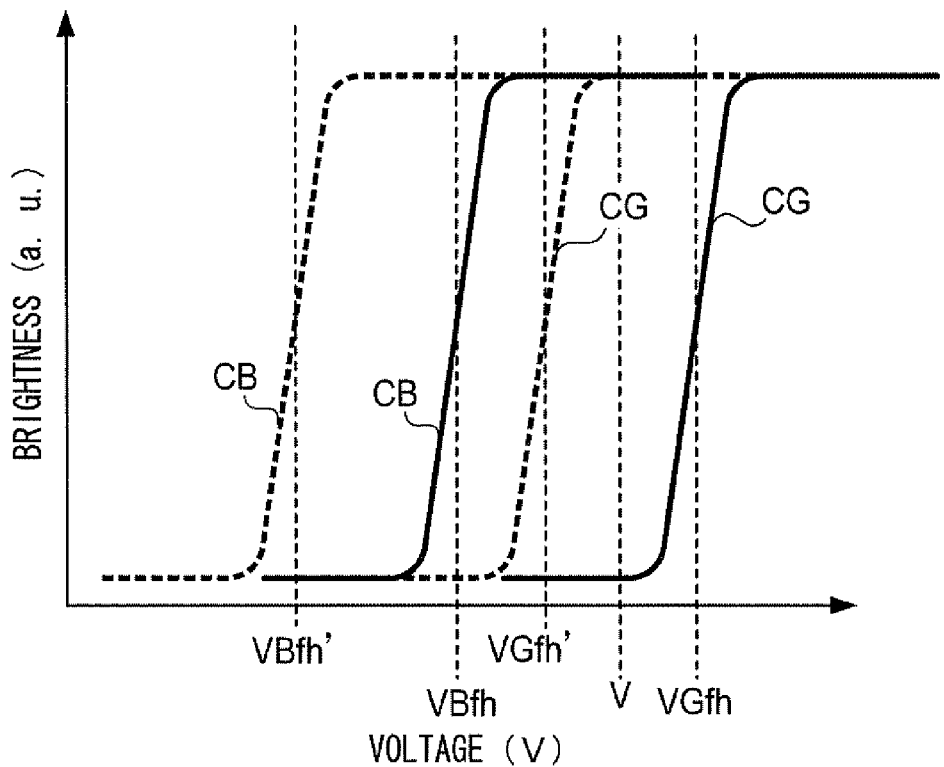
FIG. 11 illustrates design of the threshold voltage at the first stage.

FIG. 11 illustrates design of the threshold voltage at the first stage in the first exemplary embodiment. In the first embodiment, voltage application at the first exemplary embodiment causes liquid crystal layer 250G to transform into the homeotropic orientation when light P1 is irradiated, and to maintain the focal conic orientation when light P2 is irradiated. Furthermore, voltage application at the first stage causes liquid crystal layer 250B to transform to the homeotropic orientation, independent of light irradiation. Characteristics of liquid crystal layers 250G and 250B and the voltage applied at the first stage is determined.

In FIG. 11, the horizontal axis shows voltage applied to the display layer, in other words, liquid crystal layer 250 and the photoconductive layer 230. The vertical axis shows the reflectivity. The solid line corresponds to P2 (almost dark) of intensity of light, and the dashed line corresponds to P1 of intensity of light. A curve CB shows a profile of liquid crystal layer 250B and a curve CG shows a profile of liquid crystal layer 250G. Since the resistance of the photoconductive layer 230 decreases by irradiating high intensity of light, voltage applied to the liquid crystal layer 250 increases and the V-R curve shifts toward lower voltage. To obtain desired characteristics, voltage V should be satisfied at the first stage.

$$VGfh'<V<VGfh \text{ and } VBfh<V \tag{3}$$

Here, the threshold voltage VGfh denotes a threshold voltage with irradiation of light with intensity P2. The threshold voltage VGfh' denotes a threshold voltage with irradiation of light with intensity P1. The threshold voltage VBfh denotes a threshold voltage with irradiation of light with intensity P2.

Figure 12:
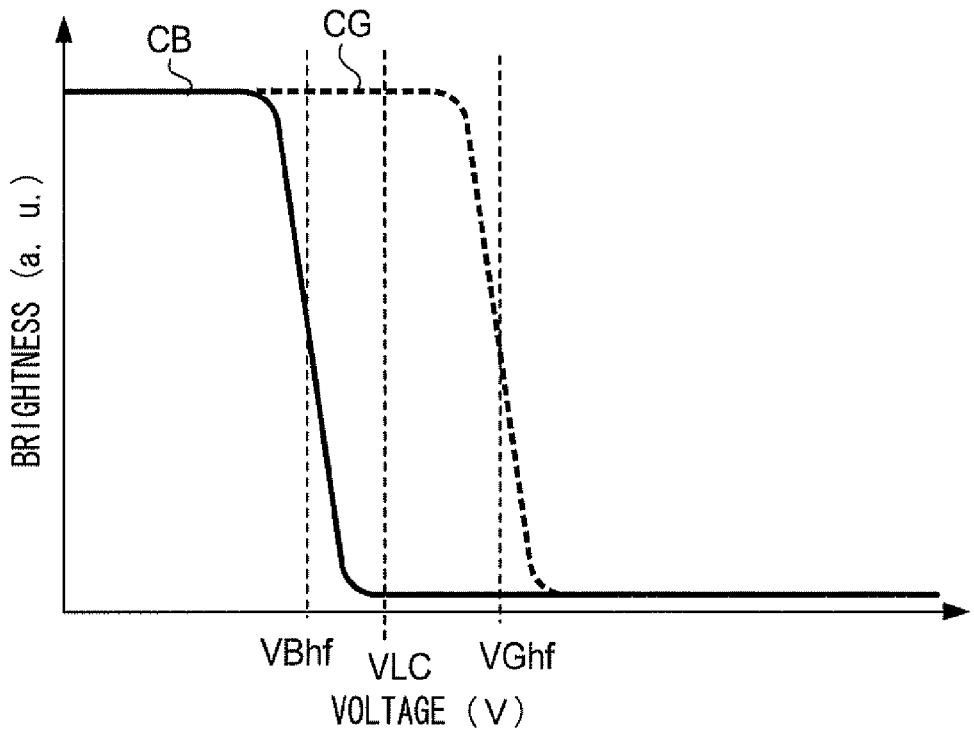
FIG. 12 illustrates design of the threshold voltage at the second stage.

FIG. 12 illustrates design of the threshold voltage at the second stage in the first exemplary embodiment. At the second stage, the residual voltage is designed so that the residual voltage in a case without light irradiation is not above the threshold voltage at which the liquid crystal layer 250G transforms from the homeotropic orientation to the focal conic orientation. In other words, the voltage VLC in equation (2) should satisfy the following equation.

$$VBhf<VLC<VGhf \tag{4}$$

Furthermore, the threshold voltage of the liquid crystal layer 250B may be greater than that of the liquid crystal layer 250G. To achieve such characteristics, relative permittivity $\epsilon\perp$ and $\epsilon//$ of the liquid crystal layer 250G should be greater than those of the liquid crystal layer 250B.

2. Second Exemplary Embodiment

The second exemplary embodiment differs from the first exemplary embodiment in that it writes black tone, in other words, (G, B)=(F, F). Hereinafter, description for matters common to the first exemplary embodiment is omitted. Furthermore, elements common to the first exemplary embodiment are denoted by the common reference numerals.

Figure 13:
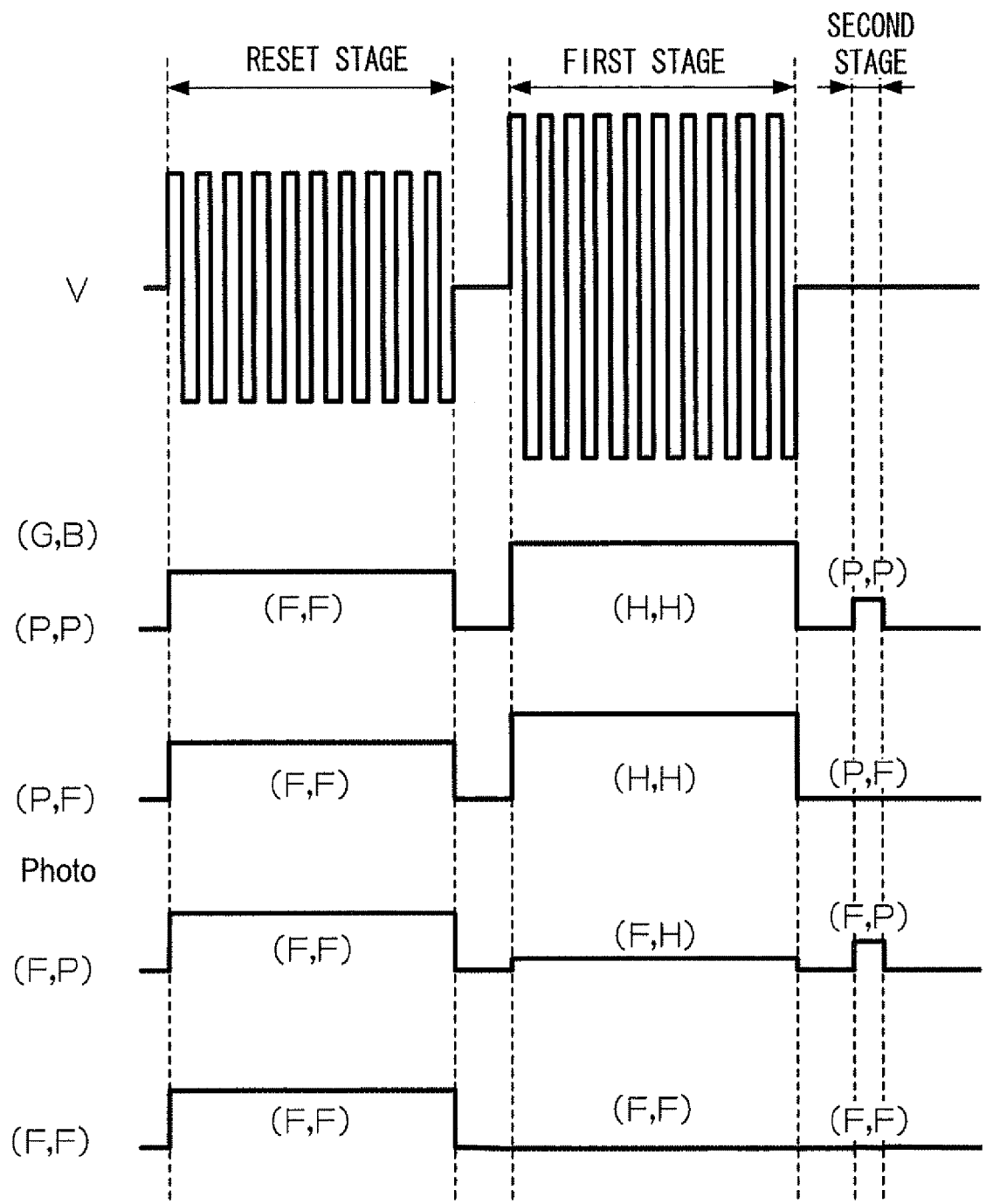
FIG. 13 shows a timing chart illustrating a process for recording an image on the e-paper 200.

FIG. 13 shows a timing chart illustrating a process for recording an image on the e-paper 200 in accordance with the second exemplary embodiment. The difference between FIGS. 13 and 4 is a process for (G, B)=(F, F). In the second exemplary embodiment, description is given for a process for (G, B)=(F, F).

In a case of (G, B)=(F, F), the irradiation unit 130 does not irradiate light at the first stage. In the present exemplary embodiment, intensity of light irradiated at the first stage is one of three levels, P1, P2, and no irradiation (dark). In a case of dark level at the first stage, voltage V applied to the liquid crystal layer 250 satisfies V<VBfh (in the example of FIG. 3), so that the liquid crystal layer 250B transforms into the focal conic orientation. As a result, after the first stage, (G, B)=(F, F). Furthermore, since no light is irradiated at the second stage, (G, B)=(F, F). According to the second exemplary embodiment, (G, B)=(F, F) independent of the light irradiation at the second stage.

Figure 14:
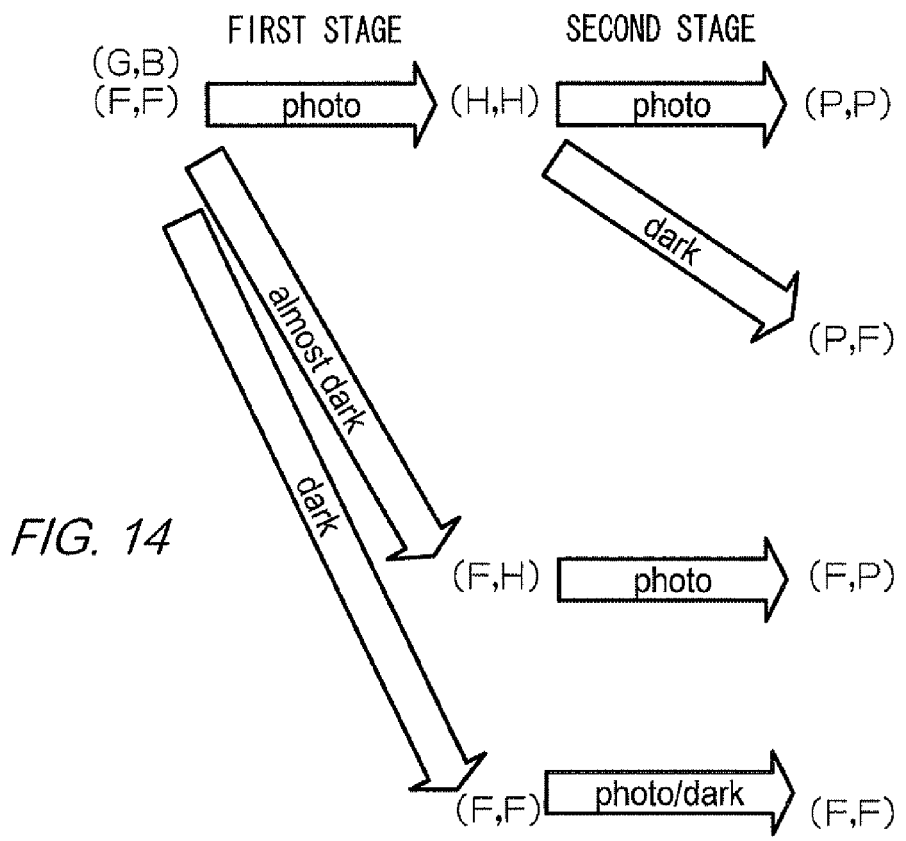
FIG. 14 illustrates control of the orientation.

FIG. 14 illustrates control of the orientation in accordance with the present exemplary embodiment. Compared with FIG. 8, transform route for (G, B)=(F, F) is changed. If the level at the first stage is dark, (G, B)=(F, F) independent on the second stage.

Figure 15:
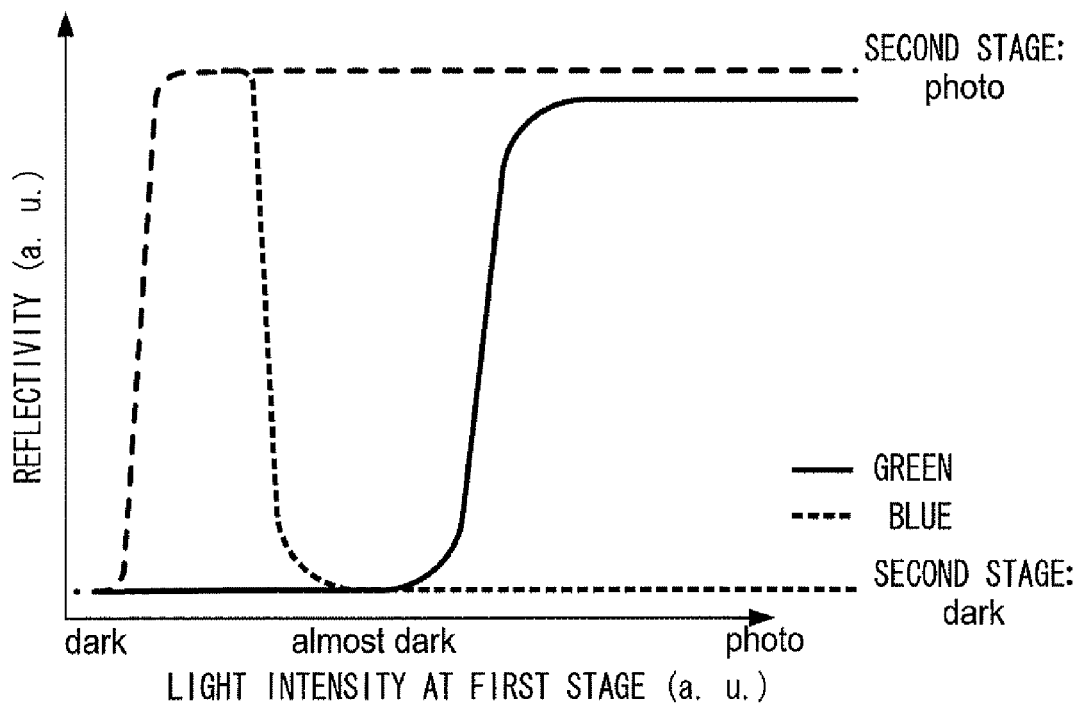
FIG. 15 illustrates control of the orientation.

FIG. 15 illustrates control of the orientation in accordance with the present exemplary embodiment. Compared with FIG. 9, transformation route for (G, B)=(F, F) is changed. In this case, the tone is (G, B)=(F, F) independent of the second stage.

Figure 16:
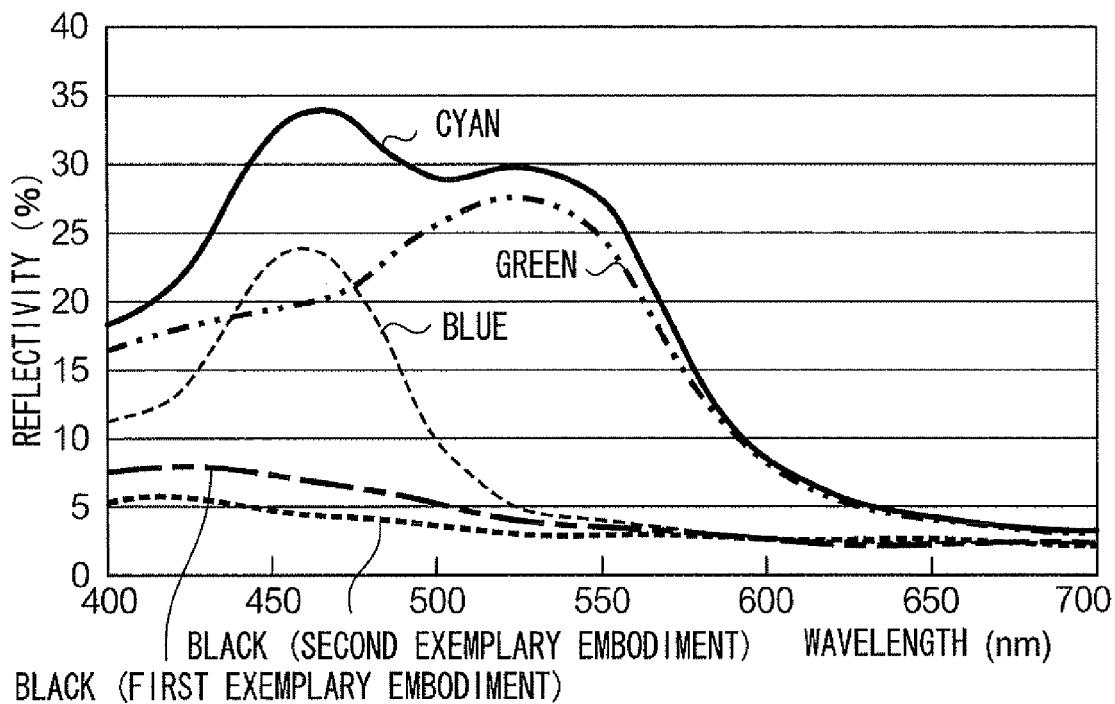
FIG. 16 shows an example of a recorded image.

FIG. 16 shows an example of record in accordance with the first and second exemplary embodiment. In FIG. 16, the vertical axis shows the reflectivity of the liquid crystal layer 250, and the horizontal axis shows the wavelength of the light. In FIG. 16, profiles for cyan (G, B)=(P, P), blue (G, B)=(F, P), green (G, B)=(P, F), and black (G, B)=(F, F). As shown in FIG. 16, the tone is improved compared with a case where the liquid crystal layer goes through the homeotropic orientation.

Figure 17:
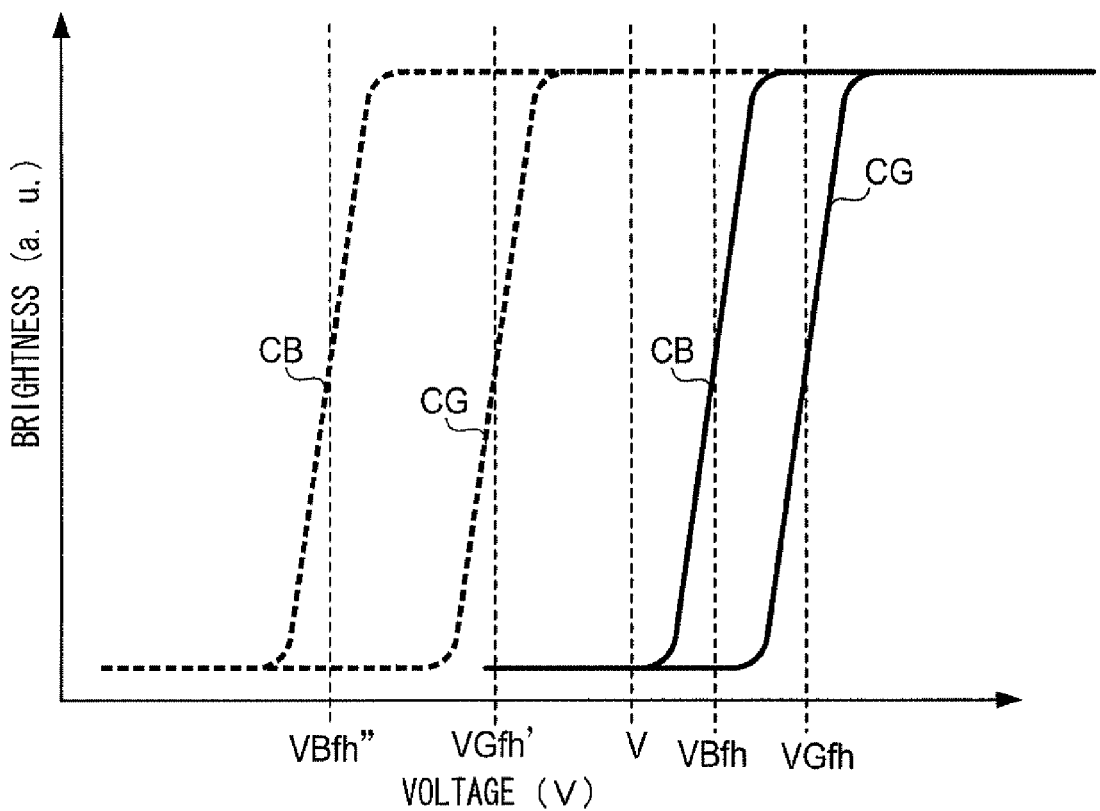
FIG. 17 illustrates design of the threshold voltage at the first stage.

FIG. 17 illustrates design of the threshold voltage at the first stage in accordance with the second exemplary embodiment. In the second exemplary embodiment, the liquid crystal layer 250G transforms into the homeotropic orientation with the light irradiation while maintaining the previous orientation without the light irradiation. The characteristics of the liquid crystal layers 250G and 250B, and the voltage applied in the first stage are determined.

In FIG. 17, the horizontal axis shows voltage applied to the display layer, in other words, voltage applied to the liquid crystal layer 250 and the photoconductive layer 230. The vertical axis shows reflectivity. Curves CB and CG show characteristics of the liquid crystal layers 250B and 250G, respectively. A solid line CG corresponds to the light irradiation of intensity P2. A solid line CB corresponds to no light irradiation. A dashed line CG corresponds to light irradiation of intensity P1. A dashed line CB corresponds to light irradiation of intensity P2. Since resistance of the photoconductive layer 230 decreases by the light irradiation, voltage applied to the liquid crystal layer increases, and therefore, the V-R curves shift toward lower voltage. To obtain desired characteristics, the voltage V applied in the first stage should satisfy the following equation.

VGfh'<V<VGfh and VBfh"<V<VBfh    (5)

Here, voltage VGfh denotes a threshold voltage with light irradiation of intensity P2. Voltage VGfh' denotes a threshold voltage with light irradiation of intensity P1. Voltage VGfh" denotes a threshold voltage with light irradiation of intensity P2. Voltage VGfh denotes a threshold voltage without light irradiation.

As described above, according to the present exemplary embodiment, (G, B)=(F, F), in other words, black tone, is shown without going through the homeotropic orientation. Thus, compared with a case of going through the homeotropic orientation, the refractivity is smaller.

3. Third Exemplary Embodiment

In the third exemplary embodiment, reflectivity of liquid crystal layer 250B with the focal conic orientation, in other words, (G, B)=(*, F) (* denotes any tone) is improved to be smaller compared with the first and second exemplary embodiments. The third exemplary embodiment is based on a technical idea to increase decay time of the residual voltage applied to the liquid crystal layer at the second stage, to reduce the reflectivity of liquid crystal layer 250B with the focal conic orientation. The decay time of the residual voltage depends on a time constant $\tau$ (CR, a product of capacitance and resistance. Refer to equations (1) and (2)) of the whole circuit. Design of the time constant of the display layer (a layer including the photoconductive layer 230 and liquid crystal layer 250) may affect other characteristics; for example, V-R curves or spectrum of the reflected light. In the third exemplary embodiment, the time constant of the whole circuit is designed independently of the time constant of the display layer. Hereinafter, difference from the first exemplary embodiment will be described.

Figure 18:
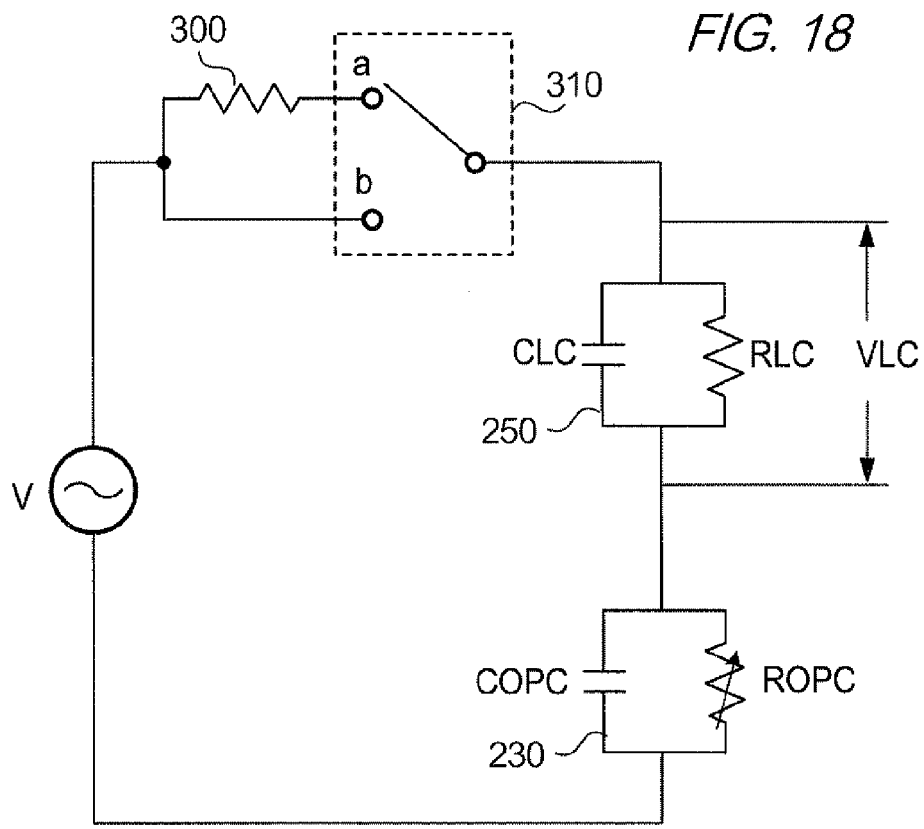
FIG. 18 shows an equivalent circuit of a recording system.

FIG. 18 shows an equivalent circuit of a recording system in accordance with the third exemplary embodiment. In an example of FIG. 18, a resistance 300 is used as an element to increase the time constant of a circuit including the display layer. A switch 310 is a switch that switches a path a and a path b. In path a, resistance 300 is series connected to the display layer. In path b, resistance 300 is not connected. The controller 110 (see FIG. 1) controls timing of application of the voltage and of operating switch 310. In other words, switch 310 is operated under the control of the controller 110. In this example, the recording device 100 includes resistance 300 and switch 310. By switching from path b to path a resistance of the circuit increases and the time constant increases. Therefore, the decay time of the residual voltage increases.

In this example, the recording device 100 operates as follows. Before initiating the reset stage, the controller 110 controls switch 310 to connect path b. After switching to path b, the controller 110 controls the irradiation unit 130 and the voltage application unit 140 to cause the process of the reset stage and the first stage. After completing the voltage application at the first stage, the controller 110 controls switch 310 to switch from path b to path a. In this example, the switching to path a is performed within 1 msec of completion of the voltage application at the first stage (in other words, after the voltage output from the voltage application unit 140 becomes approximately zero). Furthermore, after completing the voltage application at the first stage, the controller 110 controls the irradiation unit 130 and the voltage application unit 140 to cause the process of the second stage. It is to be noted that timing of switching to path a is not the same as timing of initiating the second stage.

If a predetermined time has elapsed after the process of the second stage is initiated, the controller 110 controls switch 310 to switch to connect path b. Here, the term "predetermined time" describes an amount of time by which the residual voltage applied to liquid crystal layer 250 decreases to approximately zero. The predetermined time depends on electric characteristics such as resistance or capacitance of elements, for example, liquid crystal layer 250, the photoconductive layer 230, and resistance 300.

Figure 19A:
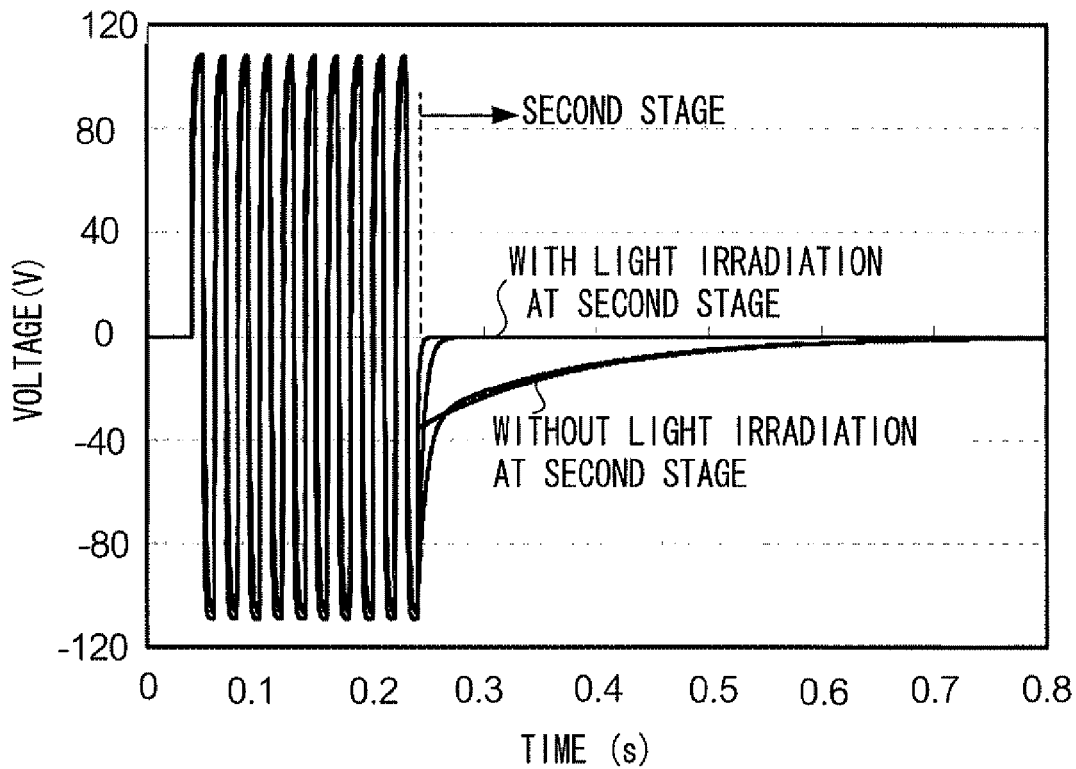
FIG. 19A shows profiles of the residual voltage with/without switching to the path a and with/without irradiation at the second stage.
Figure 19B:
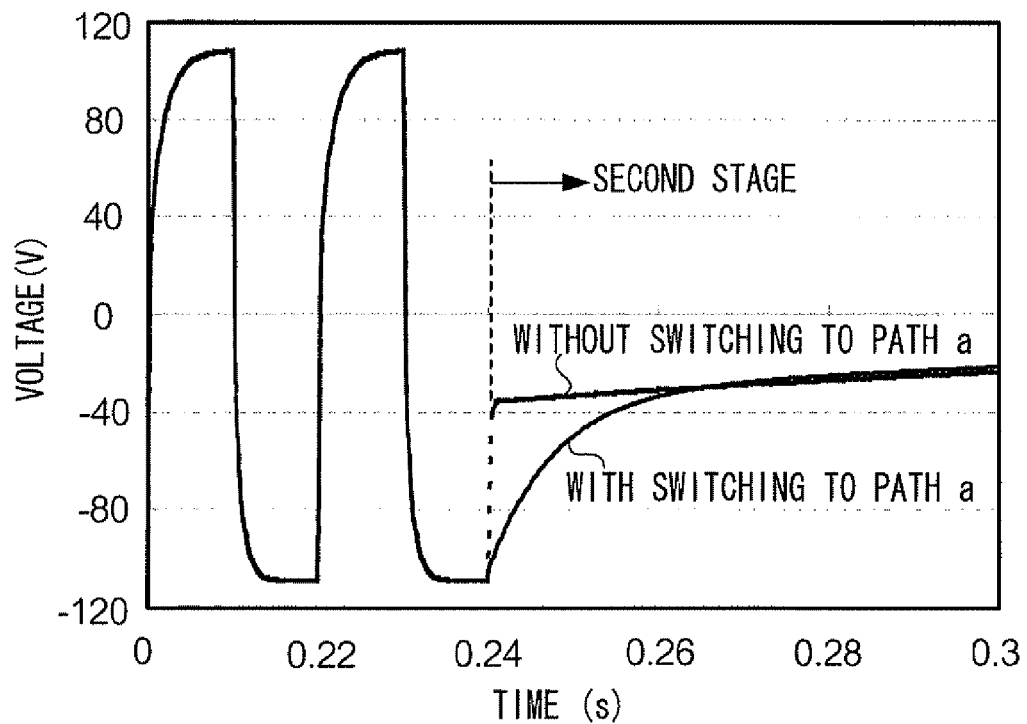
FIG. 19B shows magnified profile of with/without switching to the path a and without irradiation at the second stage.

FIGS. 19A and 19B show results of simulation of voltage applied to liquid crystal layer 250. FIG. 19A shows profiles of the residual voltage with/without switching to path a and with/without irradiation at the second stage. FIG. 19B shows a magnified profile with/without switching to path a, and without irradiation at the second stage. As is clearly shown in FIG. 19A, light irradiation at the second stage affects the decay time of the residual voltage. Furthermore, as is clearly shown in FIG. 19B, the switching to path a affects the decay time of the residual voltage. More specifically, by switching to path a, in other words, by series connecting resistance 300, the decay time of the residual voltage increases compared with connecting no resistance.

Figure 20:
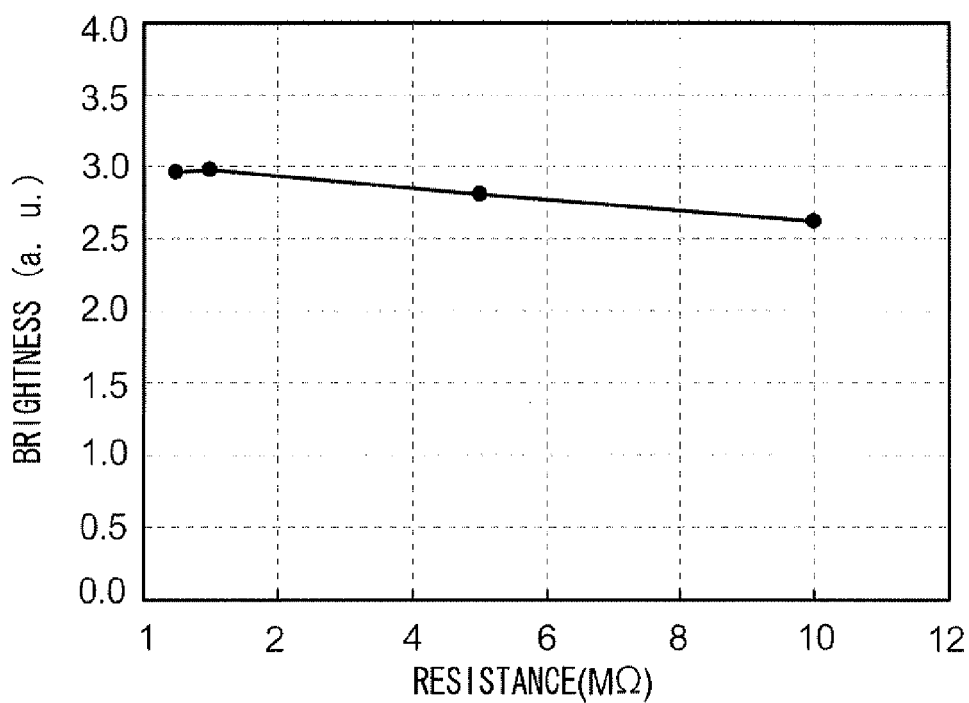
FIG. 20 shows an example of reflectivity—resistance profile.

FIG. 20 shows an example of reflectivity—resistance profile of the present exemplary embodiment. In FIG. 20, the vertical axis shows reflectivity (or brightness) of the liquid crystal layer, and the horizontal axis shows resistance of resistance 300. Data shown in FIG. 20 was obtained by experiments with application of voltage determined on the basis of the simulation results shown in FIG. 19. In FIG. 20, it is clearly shown that reflectivity decreases as resistance is increased. In other words, black tone shown by the liquid crystal layer 250B becomes darker as resistance is increased. A human has higher visual sensitivity in a lower brightness area than that in a higher brightness areareforeby reducing the reflectivity in a lower brightness area, contrast sensed by a human is effectively improved compared with a case of increasing reflectivity in a higher brightness area.

4. Further Embodiments

In the third exemplary embodiment, the element to increase the time constant of the circuit is not restricted to the resistance. Other elements may be used. For example, a capacitance may be used to increase the time constant. In such a case, the capacitance is parallel connected to the display layer. Also, an element including a combination of a resistance and a capacitance may be used to increase the time constant. In another example, a variable resistance or a variable capacitance may be used instead of a combination of resistance 300 and switch 310.

The "dark" state described in the exemplary embodiments may not be perfectly dark state. Intentional or unintentional weak light may be irradiated as long as the determined voltage can be applied to liquid crystal layer 250.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. A recording device comprising:
   a first voltage application unit that applies a first voltage to a display layer including a photoconductive layer, a first liquid crystal layer and a second liquid crystal layer, the photoconductive layer being a layer an impedance of which is changed by irradiated light, the first voltage being a voltage by which orientation of the first liquid crystal layer and the second liquid crystal layer transforms to a first orientation;
   a second voltage application unit that applies a second voltage after the application of the first voltage is terminated, the second voltage being a voltage by which orientation of the second liquid crystal layer transforms to a second orientation;
   a first irradiation unit that irradiates to the display layer first light synchronized with the application of the second voltage, the first light having a first intensity if the first light is irradiated at an area corresponding to a first tone in the first liquid crystal layer, the first light having a second intensity that is less than first intensity if the first light is irradiated at an area corresponding to a second tone in the first liquid crystal layer;
   a second irradiation unit that irradiates to the display layer second light after the application of the second voltage is terminated, the second light having a third intensity if the second light is irradiated at an area corresponding to the first tone in the second liquid crystal layer, the second light not being irradiated if the second light is irradiated at an area corresponding to the second tone in the second liquid crystal layer.

2. The recording device according to claim 1, further comprising:
   an element that increases a product of a resistance and a capacitance of a circuit including the display layer; and
   a controller that controls the element to increase the product, synchronized with the second irradiation unit.

3. A recording device comprising:
   a first voltage application unit that applies a first voltage to a display layer including a photoconductive layer, a first liquid crystal layer and a second liquid crystal layer, the photoconductive layer being a layer an impedance of which is changed by irradiated light, the first voltage being a voltage by which orientation of the first liquid crystal layer and the second liquid crystal layer transforms to a first orientation;
   a second voltage application unit that applies a second voltage after the application of the first voltage is terminated, the second voltage being a voltage by which orientation of the second liquid crystal layer with the light being irradiated transforms to a second orientation;
   a first irradiation unit that irradiates to the display layer first light synchronized with the application of the second voltage, the first light having a first intensity if the first light is irradiated at an area corresponding to a first tone in the first liquid crystal layer, the first light having a second intensity that is less than first intensity if the first light is irradiated at an area corresponding to a second tone in the first liquid crystal layer and the first tone in the second liquid crystal layer, the first light not being irradiated if the first light is irradiated at an area corresponding to the second tone in the first liquid crystal layer and in the second liquid crystal layer;
   a second irradiation unit that irradiates to the display layer second light after the application of the second voltage is terminated, the second light having a third intensity if the second light is irradiated at an area corresponding to the first tone in the second liquid crystal layer with the light irradiated by the first irradiation unit.

4. The recording device according to claim 2, further comprising:
   an element that increases a product of a resistance and a capacitance of a circuit including the display layer; and
   a controller that controls the element to increase the product, synchronized with the second irradiation unit.

5. A recording system comprising
   a recording device and
   a recording medium, wherein
   the recording device includes:
   a first voltage application unit that applies a first voltage to a display layer including a photoconductive layer, a first liquid crystal layer and a second liquid crystal layer, the photoconductive layer being a layer an impedance of which is changed by irradiated light, the first voltage being a voltage by which orientation of the first liquid crystal layer and the second liquid crystal layer transforms to a first orientation;

a second voltage application unit that applies a second voltage after the application of the first voltage is terminated, the second voltage being a voltage by which orientation of the second liquid crystal layer transforms to a second orientation;

a first irradiation unit that irradiates to the display layer first light synchronized with the application of the second voltage, the first light having a first intensity if the first light is irradiated at an area corresponding to a first tone in the first liquid crystal layer, the first light having a second intensity that is less than first intensity if the first light is irradiated at an area corresponding to a second tone in the first liquid crystal layer;

a second irradiation unit that irradiates to the display layer second light after the application of the second voltage is terminated, the second light having a third intensity if the second light is irradiated at an area corresponding to the first tone in the second liquid crystal layer, the second light not being irradiated if the second light is irradiated at an area corresponding to the second tone in the second liquid crystal layer, and the recording medium includes:

the display layer in which a residual voltage applied to the first liquid crystal layer and the second crystal layer is reduced by irradiation of the light having the third intensity.

6. The recording system according to claim 5, wherein the recording device further includes:

an element that increases a product of a resistance and a capacitance of a circuit including the display layer; and a controller that controls the element to increase the product, synchronized with the second irradiation unit.

7. A recording system comprising a recording device and a recoding medium, wherein a first voltage application unit that applies a first voltage to a display layer including a photoconductive layer, a first liquid crystal layer and a second liquid crystal layer, the photoconductive layer being a layer an impedance of which is changed by irradiated light, the first voltage being a voltage by which orientation of the first liquid crystal layer and the second liquid crystal layer transforms to a first orientation;

a second voltage application unit that applies a second voltage after the application of the first voltage is terminated, the second voltage being a voltage by which orientation of the second liquid crystal layer with the light being irradiated transforms to a second orientation;

a first irradiation unit that irradiates to the display layer first light synchronized with the application of the second voltage, the first light having a first intensity if the first light is irradiated at an area corresponding to a first tone in the first liquid crystal layer, the first light having a second intensity that is less than first intensity if the first light is irradiated at an area corresponding to a second tone in the first liquid crystal layer and the first tone in the second liquid crystal layer, the first light not being irradiated if the first light is irradiated at an area corresponding to the second tone in the first liquid crystal layer and in the second liquid crystal layer;

a second irradiation unit that irradiates to the display layer second light after the application of the second voltage is terminated, the second light having a third intensity if the second light is irradiated at an area corresponding to the first tone in the second liquid crystal layer with the light irradiated by the first irradiation unit, and second tone in the second liquid crystal layer, and the recording medium includes:

the display layer in which a residual voltage applied to the first liquid crystal layer and the second crystal layer is reduced by irradiation of the second light having the third intensity.

8. The recording system according to claim 5, wherein the recording device further includes:

an element that increases a product of a resistance and a capacitance of a circuit including the display layer; and a controller that controls the element to increase the product, synchronized with the second irradiation unit.

9. A method comprising:

applying a first voltage to a display layer including a photoconductive layer, a first liquid crystal layer and a second liquid crystal layer, the photoconductive layer being a layer an impedance of which is changed by irradiated light, the first voltage being a voltage by which orientation of the first liquid crystal layer and the second liquid crystal layer transforms to a first orientation;

applying a second voltage after the application of the first voltage is terminated, the second voltage being a voltage by which orientation of the second liquid crystal layer transforms to a second orientation;

irradiating to the display layer first light synchronized with the application of the second voltage, the first light having a first intensity if the first light is irradiated at an area corresponding to a first tone in the first liquid crystal layer, the first light having a second intensity that is less than first intensity if the first light is irradiated at an area corresponding to a second tone in the first liquid crystal layer;

irradiating to the display layer second light after the application of the second voltage is terminated, the second light having a third intensity if the second light is irradiated at an area corresponding to the first tone in the second liquid crystal layer, the second light not being irradiated if the second light is irradiated at an area corresponding to the second tone in the second liquid crystal layer.

10. The method according to claim 9, wherein controlling an element to increase a product of a resistance and a capacitance of a circuit including the display layer, synchronized with the second irradiation unit, the element increasing the product.

11. A method comprising:

applying a first voltage to a display layer including a photoconductive layer, a first liquid crystal layer and a second liquid crystal layer, the photoconductive layer being a layer an impedance of which is changed by irradiated light, the first voltage being a voltage by which orientation of the first liquid crystal layer and the second liquid crystal layer transforms to a first orientation;

applying a second voltage after the application of the first voltage is terminated, the second voltage being a voltage by which orientation of the second liquid crystal layer with the light being irradiated transforms to a second orientation;

irradiating to the display layer first light synchronized with the application of the second voltage, the first light having a first intensity if the first light is irradiated at an area corresponding to a first tone in the first liquid crystal layer, the first light having a second intensity that is less than first intensity if the first light is irradiated at an area corresponding to a second tone in the first liquid crystal layer and the first tone in the second liquid crystal layer, the first light not being irradiated if the first light is irradiated at an area corresponding to the second tone in the first liquid crystal layer and in the second liquid crystal layer;

irradiating to the display layer second light after the application of the second voltage is terminated, the second light having a third intensity if the second light is irradiated at an area corresponding to the first tone in the second liquid crystal layer with the first light.

12. The method according to claim 11, wherein controlling an element to increase a product of a resistance and a capacitance of a circuit including the display layer, synchronized with the second irradiation unit, the element increasing the product.

* * * * *